United States Patent
Hosome et al.

[19]

[11] Patent Number: 5,997,279
[45] Date of Patent: Dec. 7, 1999

[54] HOT FLUID GENERATING APPARATUS

[75] Inventors: Kazunari Hosome; Akihiko Iyanaga; Kazuhisa Mitani, all of Toyota, Japan

[73] Assignee: Toyota Jidosha Kabushiki Kaisha, Toyota, Japan

[21] Appl. No.: 08/802,571

[22] Filed: Feb. 19, 1997

[30] Foreign Application Priority Data

Feb. 23, 1996 [JP] Japan ................................. 8-036212

[51] Int. Cl.⁶ ........................................................ F23H 5/00
[52] U.S. Cl. .............................. 431/76; 431/215; 431/115
[58] Field of Search ..................... 431/115, 215, 431/164, 161, 76; 432/181; 126/91 A

[56] References Cited

U.S. PATENT DOCUMENTS

| | | | |
|---|---|---|---|
| 3,612,174 | 10/1971 | Schaan et al. | 165/156 |
| 4,090,558 | 5/1978 | Akama | 165/156 |
| 4,983,118 | 1/1991 | Hovis et al. | 431/161 |
| 4,995,807 | 2/1991 | Rampley et al. | 431/115 |
| 5,120,214 | 6/1992 | West et al. | 431/76 |
| 5,443,040 | 8/1995 | Kaji et al. | 431/215 |
| 5,460,519 | 10/1995 | Hirose et al. | 126/91 A |
| 5,511,971 | 4/1996 | Benz et al. | 431/115 |
| 5,522,348 | 6/1996 | Tanaka et al. | 126/91 A |
| 5,571,006 | 11/1996 | Nakamachi et al. | 431/164 |
| 5,628,629 | 5/1997 | Mitani et al. | 432/181 |
| 5,647,741 | 7/1997 | Bunya et al. | 432/181 |

FOREIGN PATENT DOCUMENTS

| | | | |
|---|---|---|---|
| 6-221545 | 8/1994 | Japan . | |
| 2036940 | 7/1980 | United Kingdom | 431/215 |

*Primary Examiner*—Carroll Dority
*Attorney, Agent, or Firm*—Pillsbury Madison & Sutro LLP

[57] ABSTRACT

A hot fluid generating apparatus includes a combustion chamber, a regenerative combustion burner, a fluid passage formed along a wall structure of the combustion chamber, and a device for causing fluid to flow in the fluid passage. The combustion chamber has a flame radiation heat transfer only as a heat transfer portion. A portion of the wall structure opposite to the burner is utilized as a radiation heat transfer portion. A portion of exhaust gas from the burner is recirculated to the supply air to suppress generation of NOx. A portion of the wall structure close to the burner is formed to be a cone.

16 Claims, 8 Drawing Sheets

HOT FLUID GENERATING APPARATUS

This application is based on application No. HEI 8-36212 filed in Japan on Feb. 23, 1996, the content of which is incorporated hereinto by reference.

BACKGROUND OF THE INVENTION

1. Field of the Invention

The present invention relates to a hot fluid generating or producing device. The fluid may be gas, such as air, or liquid, such as water.

2. Description of Related Art

A typical conventional hot fluid generating apparatus in the form of a hot air generating furnace used for heating or drying is illustrated in FIG. 11. The furnace includes a combustion chamber 73 defined within combustion chamber walls, fire tubes 75, a smoke box 74, a casing 72 and a burner 76. The burner 76 sends a flame 77 into the combustion chamber 73 and exhaust gas is exhausted to the atmosphere through an interior of each fire tube 75, the smoke box 74 and an exhaust duct connected to the smoke box 74. Combustion air is supplied by a fan 71 to an exterior of each fire tube 75 where heat of the exhaust gas is transferred to the supply air by convection and then is further heated by radiation from the flame when the supply air passes through a passage 78 between the wall of the combustion chamber 73 and the casing 72. The heated air is supplied via a duct to a thermal equipment (not shown) requiring the heated air.

However, the conventional furnace has the following problems:

① In combustion conducted using the conventional gun-type burner, a hot spot is generated in a wall of the combustion chamber and a concentrated thermal stress is caused at the hot spot. To endure the concentrated stress, grading-up of the wall material is necessary, accompanied by an increase in cost. The reason for causing the hot spot is that a flame of the conventional gun-type burner has a non-flat temperature distribution having a peak as illustrated in FIG. 12.

② In the furnace having the conventional gun-type burner, not only the combustion chamber (i.e., a radiation heat transfer portion) but also the fire tube portion (convective heat transfer portion) needs to be provided for obtaining a high efficiency. More particularly, in the combustion chamber of the conventional furnace, heat transfer by convection is weak because substantially no circulation of combustion gas occurs in the combustion chamber and heat transfer by radiation is also weak because a flat and high temperature distribution is not generated in the combustion chamber. Since heat of the combustion gas is not sufficiently transferred to the air flowing in the fluid passage by means of the combustion chamber only, the fire tube portion has to be provided to obtain a high rate of heat transfer. As a result, the furnace is complicated in structure and large in size, resulting in an increase in cost.

SUMMARY OF THE INVENTION

An object of the present invention is to provide a hot fluid generating apparatus where a hot spot is unlikely to be caused in a wall thereof.

A subsidiary object of the present invention is to provide a hot fluid generating apparatus that can be simplified in structure.

The above-described object can be achieved by the apparatus according to the present invention having the following structures (1) to (10):

(1) A hot fluid generating apparatus according to the present invention includes a combustion chamber, a burner system, a fluid passage and a device for causing fluid to flow through the fluid passage. Wall structure defines a combustion chamber including a flame radiation heat transfer portion. The burner system includes at least one regenerative combustion burner each including a heat storage member and conducts a regenerative combustion wherein combustion air is supplied through the heat storage member into the combustion chamber forming a flame within the combustion chamber. Exhaust gas from the combustion chamber is exhausted through the heat storage member whereby a portion of heat of the exhaust gas is stored in the heat storage member so that the heat stored in the heat storage member is then released to, and preheats, combustion air flowing through the heat storage member. The fluid passage is formed along the wall of the combustion chamber.

(2) The combustion chamber may include a heat transfer portion including the flame radiation heat transfer portion only.

(3) The wall of the combustion chamber may have a portion located opposite the at least one regenerative combustion burner, and that portion of the wall is utilized as a portion of the flame radiation heat transfer portion.

(4) The fluid passage may be open toward an upstream thereof and the device may include a suction fan connected to the fluid passage at the downstream side thereof.

(5) The device may include a blower or fan connected to the fluid passage at the upstream side.

(6) The wall of the combustion chamber may have a fin protruding into the fluid passage.

(7) The wall may include a wavy portion having an outside surface exposed to the fluid passage.

(8) The burner system may include an air supply passage and an exhaust gas passage connected to the at least one regenerative combustion burner. The burner system may further include an exhaust gas recirculation passage for permitting a portion of exhaust gas flowing in the exhaust gas passage to recirculate to the air supply passage. The exhaust gas recirculation passage may be provided with a damper.

(9) The damper may be controlled to close the exhaust gas recirculation passage during starting the apparatus from a cold state.

(10) The wall of the combustion chamber may have a portion adjacent to the at least one regenerative combustion burner, and that portion of the wall may have the shape of a cone gradually decreased in diameter toward the at least one regenerative combustion burner.

In the apparatus having the above-described structure (1), since the regenerative combustion burner is used, air supply and gas exhaust are conducted by the same burner accompanied by circulation of combustion gas (burnt fuel gas to be exhausted) of high temperatures in the combustion chamber and combustion is slacked due to the exhaust gas recirculation (EGR) in the combustion chamber. Due to the slack of combustion, the flame or combustion zone is extended toward an end of the combustion chamber opposite to the burner and the temperature distribution in the combustion chamber is made uniform. As a result, a hot spot is unlikely to be caused in the wall of the combustion chamber.

By using the regenerative combustion burner, since the temperature distribution is made uniform, the temperature is permitted to be raised throughout the entirety of the combustion chamber, so that a sufficient heat transfer is obtained at the radiation heat transfer portion only and therefore a convective heat transfer portion (the fire tube portion of the conventional apparatus) does not need to be provided. In the apparatus having the above-described structure (2), because a convective heat transfer portion is removed, the apparatus is simplified and compact.

By using the regenerative combustion burner, since the flame extends to the opposite end of the combustion chamber, the wall of the opposite end can be utilized as a convective heat transfer portion. In the apparatus having the above-described structure (3), because the opposite end wall is utilized as a convective heat transfer portion, the apparatus is simplified and compact.

In the apparatus having the above-described structure (4), since the device sucks the fluid into the fluid passage from the downstream thereof and the upstream end of the fluid passage is open throughout the entire circumference thereof, the fluid flows uniformly in the fluid passage, so that an efficiency of heat transfer from the gas in the combustion chamber to the fluid in the fluid passage is improved.

In the apparatus having the above-described structure (5), since the device supplies the fluid to the fluid passage from the upstream side, the device does not need to have a heat-proof structure.

In the apparatus having the above-described structure (6), since the fin protrudes into the fluid passage, turbulence is generated in the fluid flowing in the fluid passage, so that the convective heat transfer is improved and the efficiency of heat transfer is improved.

In the apparatus having the above-described structure (7), since the wall has a wavy portion exposed to the fluid passage, turbulence is generated in the fluid flowing in the fluid passage, so that the efficiency of heat transfer is improved.

In the apparatus having the above-described structure (8), since the air supply passage and the exhaust gas passage are connected to each other by the exhaust gas recirculation passage and the damper is provided in the exhaust gas recirculation passage, a portion of exhaust gas is recirculated to the air supply passage and the amount of the recirculated exhaust gas can be controlled by the damper. As a result, slack combustion is conducted in the combustion chamber, and generation and exhaust to the atmosphere of nitrogen oxides (NOx) are suppressed so that the apparatus is clean and environmental friendly. Further, by recirculation of the exhaust gas, since a portion of sensible heat of the exhaust gas after the heat has been retrieved by the heat storage member is retrieved to the input side, the thermal efficiency of the apparatus is maintained to be high.

In the apparatus having the above-described structure (9), since the damper is closed when the apparatus is started from a cold state, no exhaust gas is recirculated from the exhaust gas to the supply air at that time, the combustibility is maintained good during start-up.

In the apparatus having the above-described structure (10), since the wall of the combustion chamber is decreased in diameter toward the burner at the portion of the wall close to the burner, self-recirculation of the burnt fuel gas to the flame in the combustion chamber is conducted smoothly so that slack combustion and suppression of generation of NOx are effectively obtained.

BRIEF DESCRIPTION OF THE DRAWINGS

The above and other objects, features, and advantages of the present invention will become more apparent and will be more readily appreciated from the following detailed description of the preferred embodiments of the present invention in conjunction with the accompanying drawings, in which.

DETAILED DESCRIPTION OF THE PREFERRED EMBODIMENT

Figure 1:
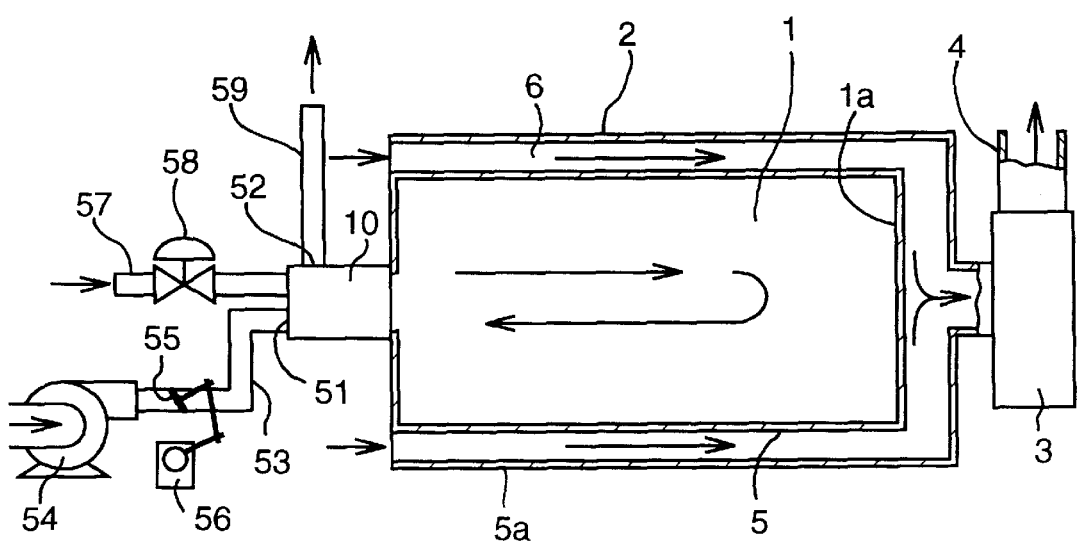
FIG. 1 is a schematic view, partially in section, of a hot fluid generating apparatus according to a first embodiment of the present invention.
Figure 2:
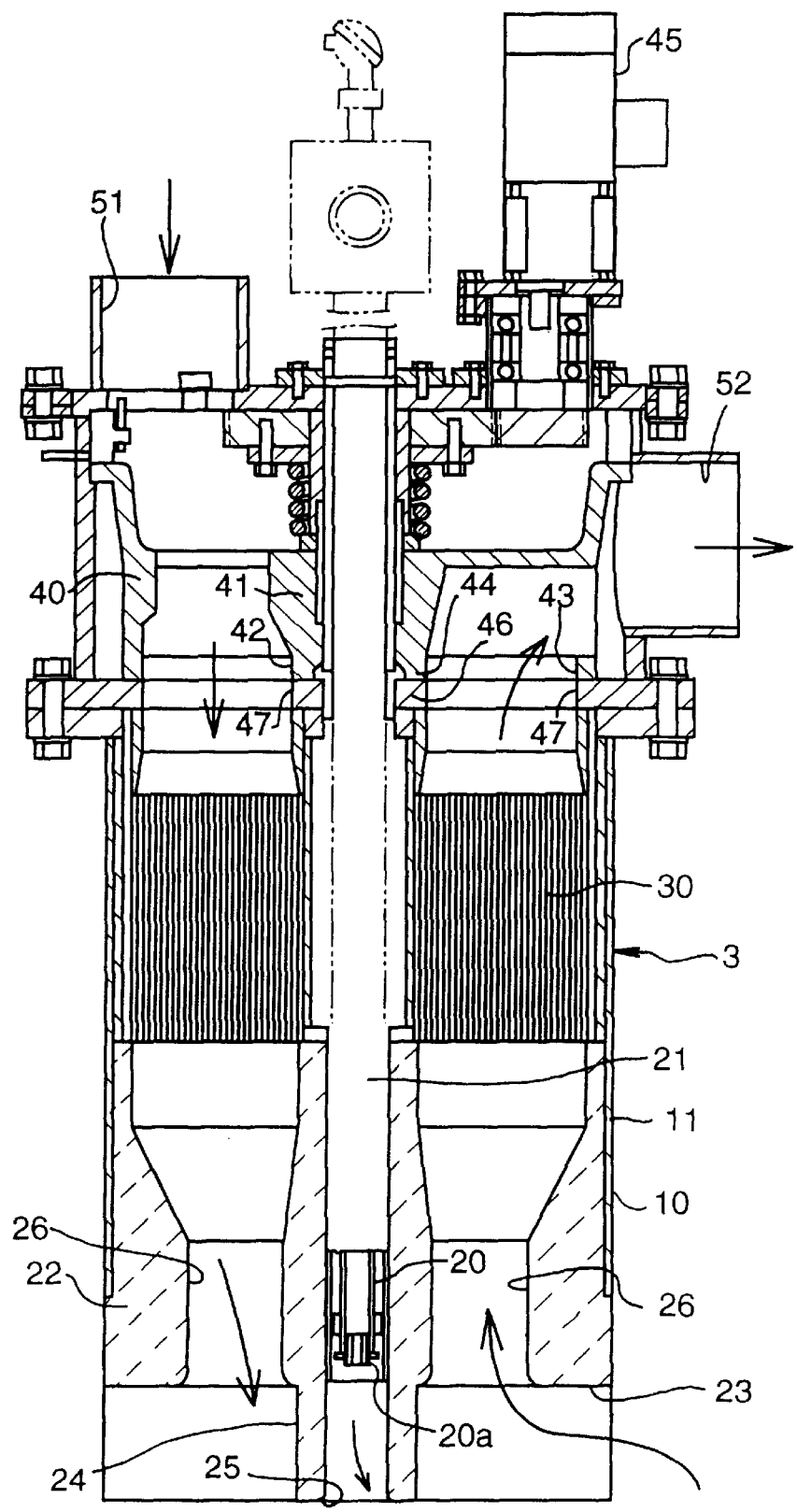
FIG. 2 is an enlarged cross-sectional view of a regenerative combustion burner which can be used in the apparatus according to the present invention.
Figure 3:
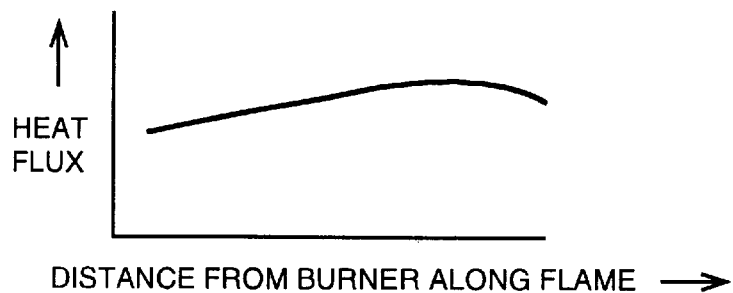
FIG. 3 is a graph illustrating a thermal flux distribution along a flame in the apparatus according to the present invention.
Figure 4:
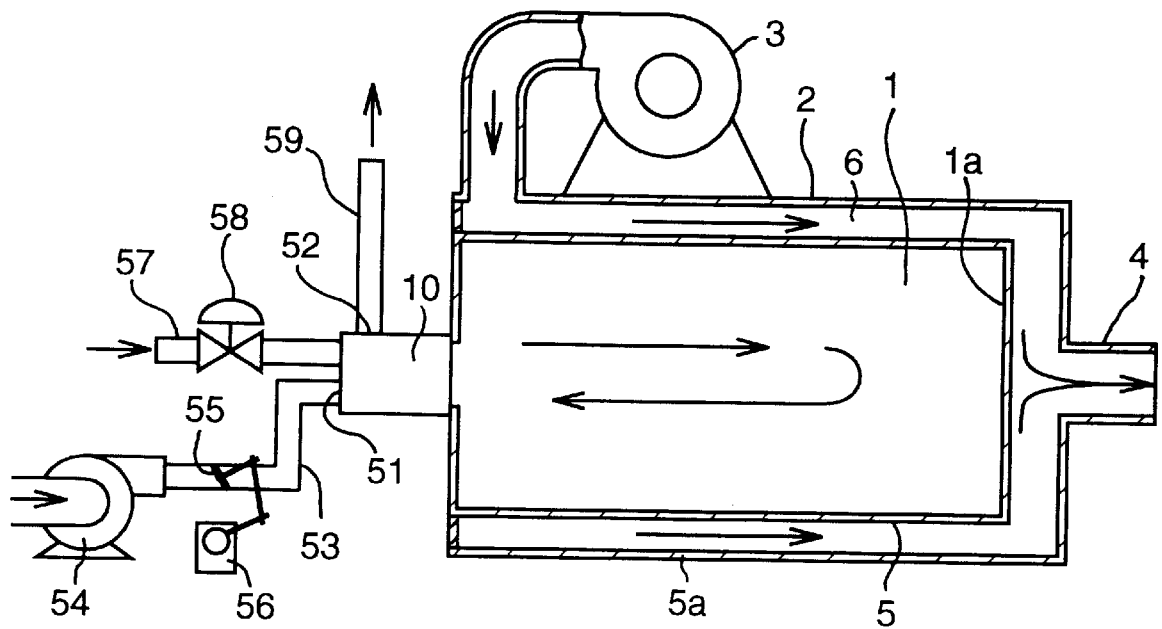
FIG. 4 is a schematic view, partially in section, of a hot fluid generating apparatus according to a second embodiment of the present invention.
Figure 5:
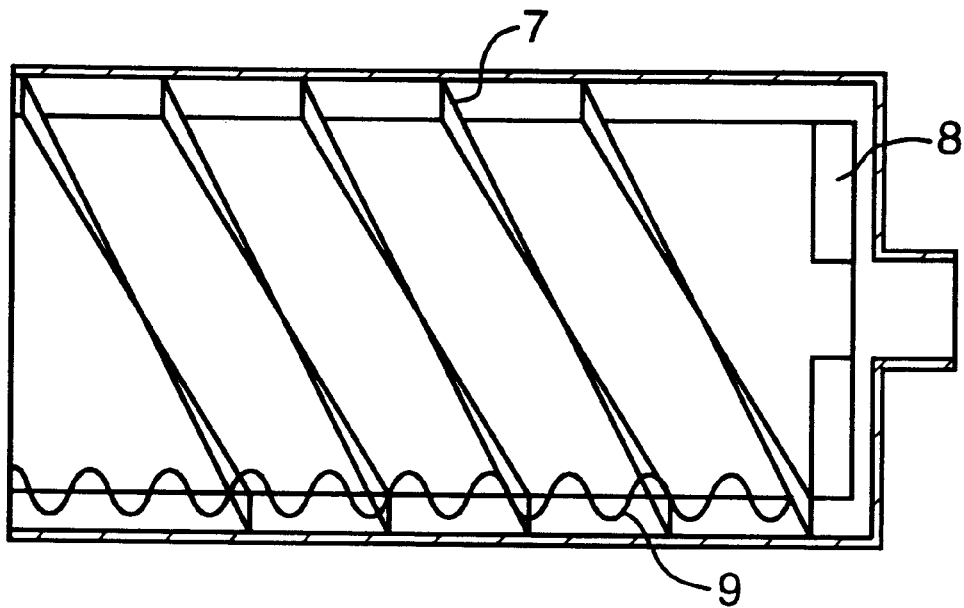
FIG. 5 is a schematic cross-sectional view of a hot fluid generating apparatus according to a third embodiment of the present invention.
Figure 6:
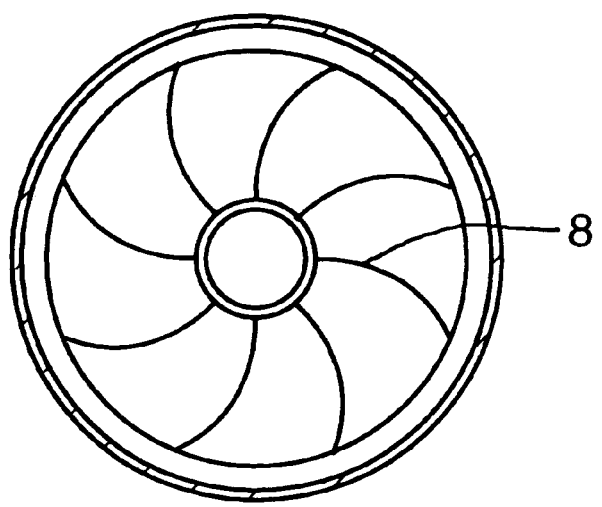
FIG. 6 is a side view of the apparatus of FIG. 5 as viewed from a right side.
Figure 7:
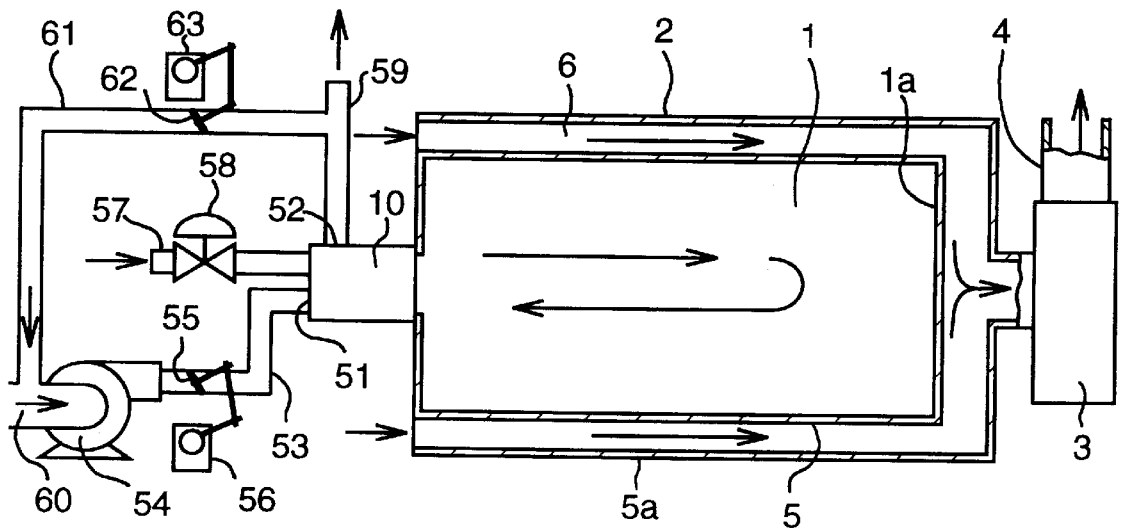
FIG. 7 is a schematic view, partially in section, of a hot fluid generating apparatus according to a fourth embodiment of the present invention.
Figure 8:
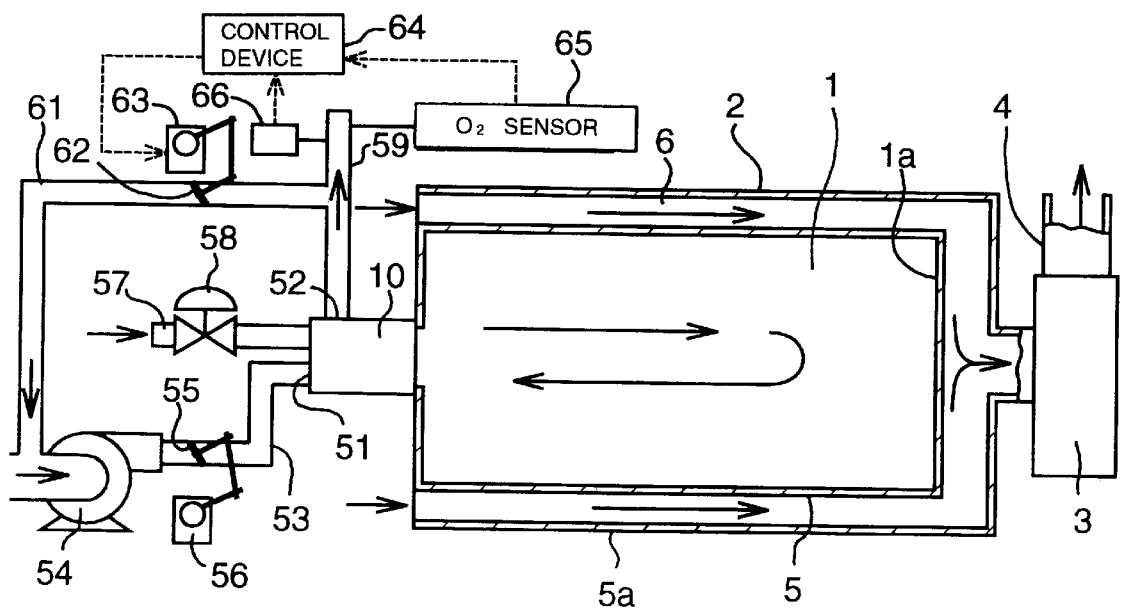
FIG. 8 is a schematic view, partially in section, of a hot fluid generating apparatus according to a fifth embodiment of the present invention.
Figure 9:
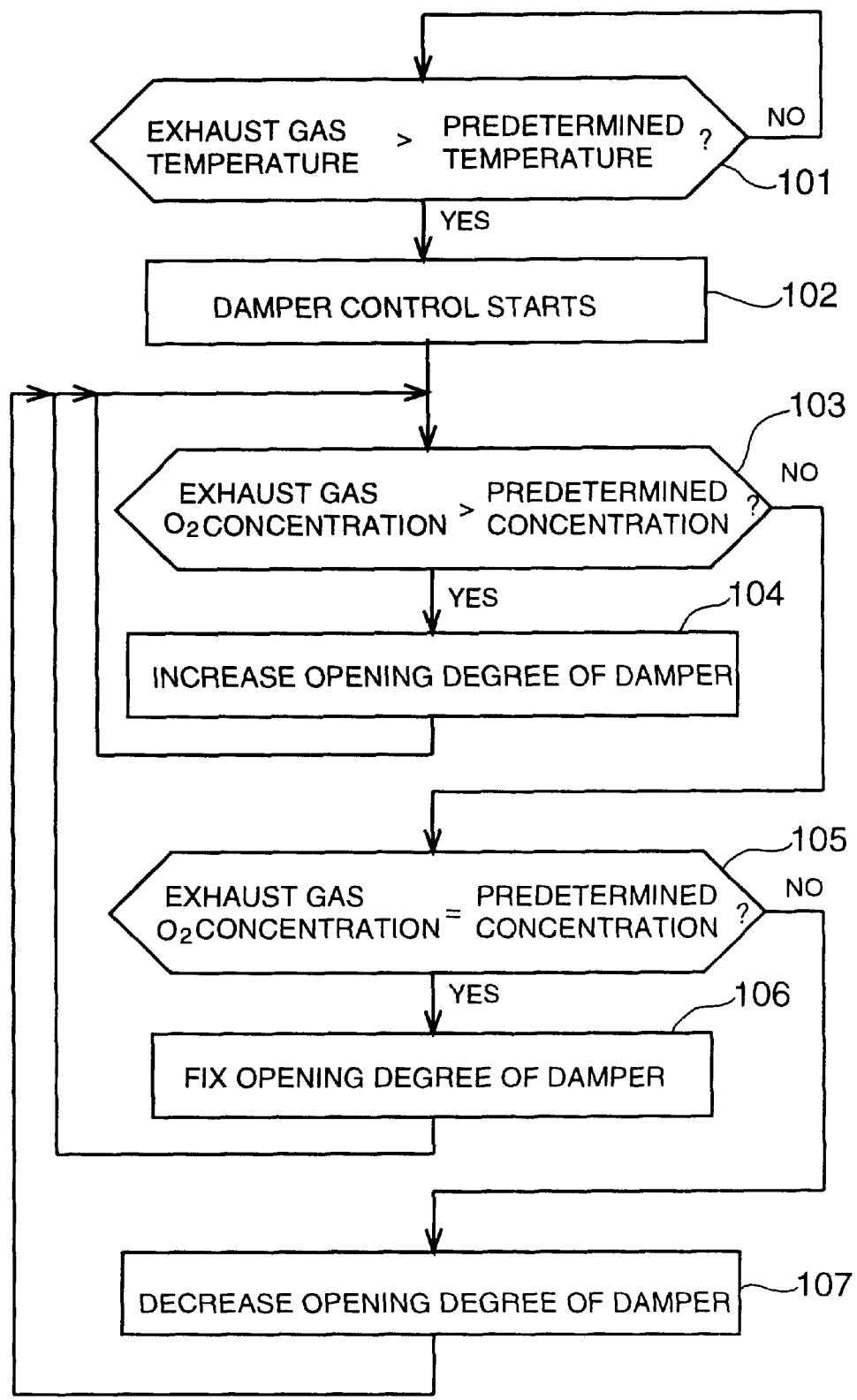
FIG. 9 is a flow chart for control of exhaust gas recirculation in the apparatus of FIG. 8.
Figure 10:
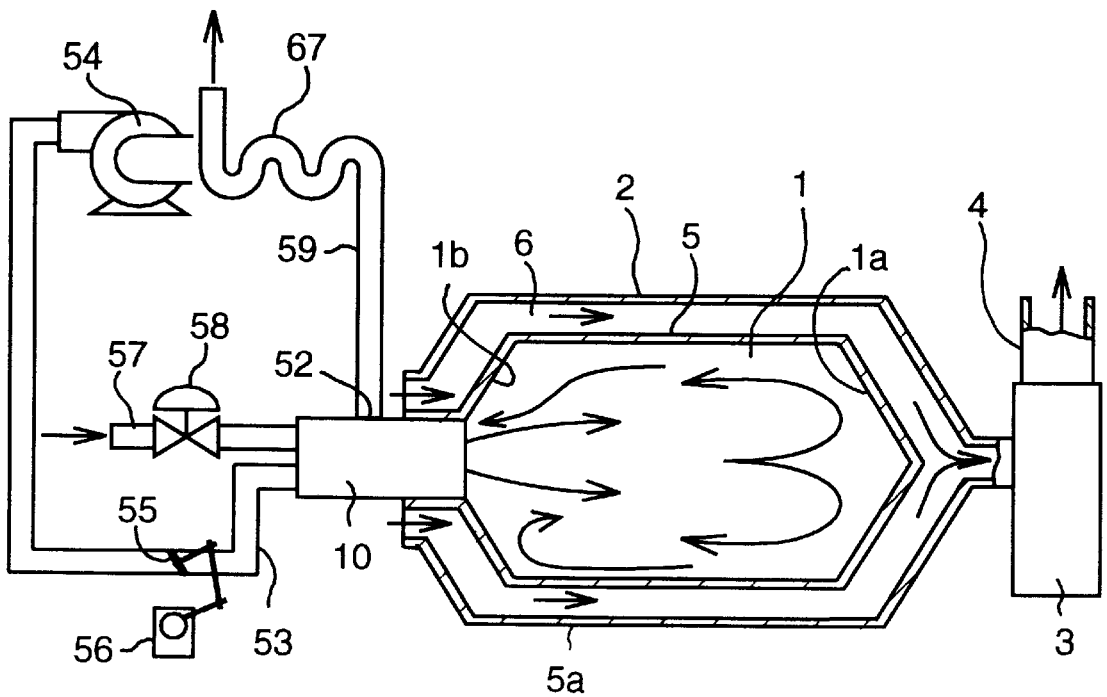
FIG. 10 is a schematic view, partially in section, of a hot fluid generating apparatus according to a sixth embodiment of the present invention.
Figure 11:
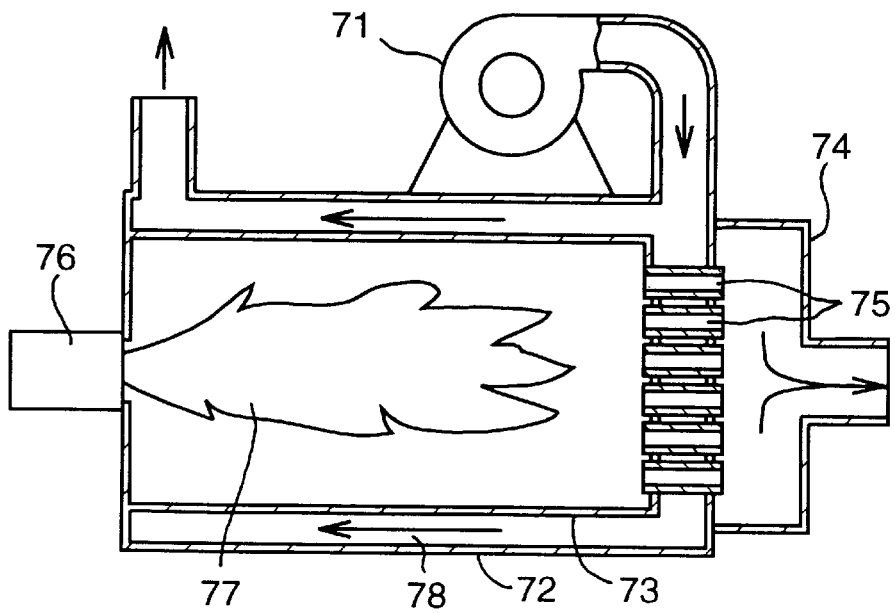
FIG. 11 is a schematic cross-sectional view of a conventional hot air generating apparatus.
Figure 12:
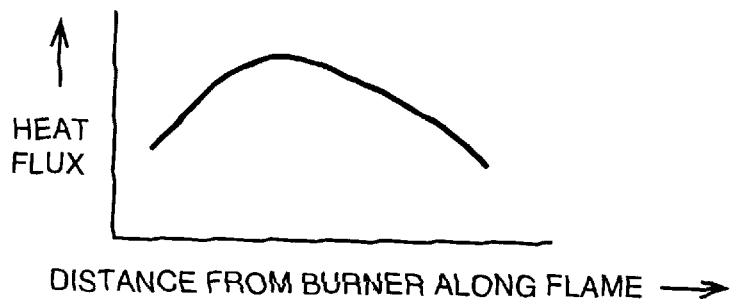
FIG. 12 is a graph illustrating a thermal flux distribution along a flame in the apparatus of FIG. 11.

FIG. 1 illustrates a first embodiment of the present invention; FIGS. 2 and 3 can be applied to any embodiment of the present invention; FIG. 4 illustrates a second embodiment of the present invention; FIGS. 5 and 6 illustrate a third embodiment of the present invention; FIG. 7 illustrates a fourth embodiment of the present invention; FIGS. 8 and 9 illustrate a fifth embodiment of the present invention; and FIG. 10 illustrates a sixth embodiment of the present invention. Portions common or similar to all of the embodiments of the present invention are denoted with the same reference numerals throughout all of the embodiments of the present invention.

First, portions of a hot fluid generating apparatus common or similar to all of the embodiments of the present invention will be explained taking a hot air generating apparatus as an example (though a hot fluid of the present invention is not limited to hot air), with reference to, for example, FIGS. 1–3 and FIG. 13.

A hot fluid generating apparatus according to any embodiment of the present invention includes a combustion chamber 1, a burner system including at least one regenerative combustion burner 10, a fluid passage 6 and a device 3 for causing fluid (which may be gas such as air or liquid such as water) to flow through the fluid passage 6. The combustion chamber 1 has a generally rectangular interior wall structure 5 defining the combustion chamber 1 spaced from an exterior wall 5a. The combustion chamber 1 includes a flame radiation heat transfer portion. Each regenerative combustion burner 10 includes a heat storage member 30 and conducts a regenerative combustion wherein air for combustion is supplied through the heat storage member 30 into the combustion chamber 1 forming a flame within the combustion chamber 1. Burnt fuel gas is exhausted from the combustion chamber 1 through the heat storage member 30. A portion of heat of the exhaust gas is stored in the heat storage member 30 so that the heat stored in the heat storage member 30 is then released to and preheats air for combustion flowing through the heat storage member 30. A casing 2 including wall 5a is provided outside the wall structure 5 of the combustion chamber 1 so as to form a gap, operating as the fluid passage 6 between the wall structure 5 and the wall 5a. The fluid passage 6 extends along the wall 5 of the combustion chamber 1. The device 3 is connected to the fluid passage 6 and causes a fluid to flow in the fluid passage 6. The device 3 includes, for example, a fan, a blower or a pump.

The burner system may include a single burner which is of the type capable of switching air supply and gas exhaust by itself or may include a pair of burners where switching between air supply and gas exhaust is conducted by means of a valve provided outside of the burners.

In the case of the burner system including a single burner, as illustrated in FIG. 2, the regenerative combustion burner 10 includes a casing 11 housing the heat storage member 30 therein, a burner tile 22 disposed on one axial side of the heat storage member 30, a switching mechanism 40 for switching air supply and gas exhaust disposed on another, opposite axial side of the heat storage member 30, and a fuel supply pipe 20 extending through the switching mechanism 40 and the heat storage member 30 to the burner tile 22.

The fuel supply pipe 20 extends axially at a radially central portion of the burner. A pilot air pipe 21 extends coaxially with the fuel supply pipe 20. Pilot air flows in an annular passage defined between an outside surface of the fuel supply pipe 20 and an inside surface of the pilot air pipe 21. A pilot fuel outlet 20a is formed in a tip portion of the fuel supply pipe 20 through which a portion of fuel is injected as pilot fuel. The pilot fuel is ignited by an electrical spark formed between the tip portion of the fuel supply pipe 20 and the pilot air pipe 21 to form a pilot flame. A main portion of the fuel is expelled from the tip end of the fuel supply pipe 20 (fuel injection nozzle) and flows through a fuel release surface 25 formed in the burner tile 22 into the combustion chamber. The main portion of the fuel is mixed with main air expelled into the combustion chamber 1 through an air supply and gas exhaust hole 26 to form a main flame in front of the burner in the combustion chamber 1.

The heat storage member 30 retrieves heat of the exhaust gas and stores the heat therein when the exhaust gas flows through the heat storage member 30, and releases the storing heat to the main air when the main air flows through the heat storage member 30 to preheat the main air. The heat storage member 30 is divided into a plurality of sections in a circumferential direction of the burner. When supply air is flowing in a part of the sections of the heat storage member 30, exhaust gas is flowing in the remaining part of the sections of the heat storage member 30. Switching between air supply and gas exhaust is conducted by the switching mechanism 40.

The heat storage member 30 is constructed of heat resistant material, such as ceramic or heat resistant metal alloys. Preferably, the heat storage member 30 has a monolithic honeycomb structure to provide a large gas contact area. However, the heat storage member 30 is not limited to a honeycomb structure, and may alternatively be composed of a bundle of wire rods or pipes each having a small diameter. Preferably, the heat storage member 30 is divided into a plurality of portions also in the axial direction of the heat storage member 30 to prevent cracks due to temperature gradients and to make construction easy.

The burner tile 22 is constructed from heat resistant material such as ceramic or heat resistant metal alloys. The burner tile 22 includes a protruding portion 24 extending forward from an air supply and gas exhaust surface 23. The fuel release surface 25 of the burner tile 22 is formed on an inner surface of the protruding portion 24, and the air supply and gas exhaust holes 26 are formed in a portion of the burner tile 22 radially outside of the protruding portion 24.

The air supply and gas holes 26 correspond to sections of the heat storage member 30, respectively. When exhaust gas is flowing in a part of the holes 26, main air is flowing in the remaining part of the holes 26. The main air flows in a direction from the heat storage member 30 to the combustion chamber to the heat storage member 30. Switching between air supply and gas exhaust at the holes 26 is conducted corresponding to the switching between supply air and gas exhaust at the sections of the heat storage member 30.

The switching mechanism 40 includes a movable or rotatable member 44, a stationary member 46 and a partitioning wall 46 separating a supply air flow area and an exhaust gas flow area from each other. The stationary member 46 includes a plurality of apertures 47 corresponding to the sections of the heat storage member 30. The rotatable member 44 includes an opening 42 provided on one side of the partitioning wall 46. One of the openings 42 and 43 communicates with an air inlet 51 and the other of the openings 42 and 43 communicates with a gas outlet 52. The rotatable member 44 is driven by a drive device 45 (for example, an electric motor, an air cylinder, etc.) in one direction or in opposite directions. By rotating the rotatable member so that communication of one of the openings 42 and 43 with the aperture 47 is switched to the other of the openings 42 and 43, air supply and gas exhaust at the heat storage member 30 and the air supply and gas exhaust holes 26 are switched.

An air supply passage 53 is connected to the air inlet 51, and the air supply passage 53 leads the supply air from the blower or fan 54 to the air inlet 51. A damper 55 is installed in the air supply passage 53 to control the amount of the supply air. The damper 55 is driven by a damper drive device 56. An exhaust gas passage 59 is connected to the gas outlet 52 and exhaust gas is exhausted to the atmosphere through the exhaust gas passage 59. Fuel (for example, gaseous fuel or liquid fuel) is supplied to the fuel supply pipe 20 via a fuel supply 57 in which a valve 58 for controlling the amount of fuel to be supplied is installed.

Figure 13:
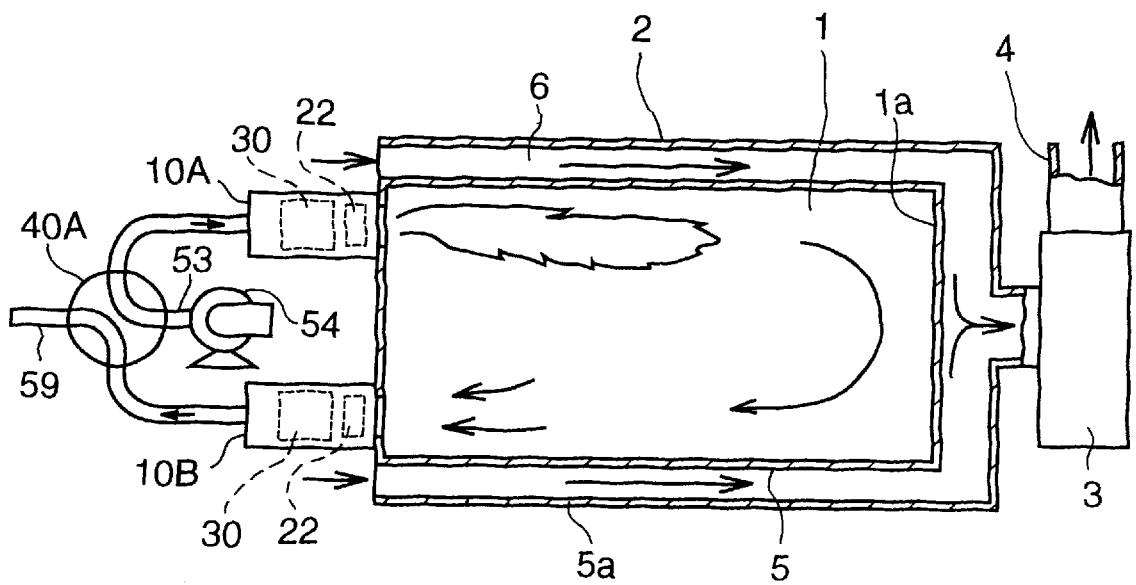
FIG. 13 is a schematic system diagram of a burner system having a pair of regenerative combustion burners which are alternatively switched.

In the case where the burner system includes a pair of regenerative combustion burners 10A and 10B disposed closely to each other, as illustrated in FIG. 13, each of the burners 10A and 10B are connected to piping for use in air supply to, and gas exhaust from, each of the burners 10A and 10B. The piping includes an air supply passage 53 and an exhaust gas passage 59. A switching valve 40A (for example, a four port valve) is disposed at an intersection of the passages 53 and 59, and switching between air supply to and gas exhaust from each burner 10A, 10B is conducted by the switching valve 40A outside the burners 10A and 10B. Therefore, the switching mechanism 40 which is provided in the burner in the case of the single burner system is not provided in the burners 10A and 10B. The other structures are the same as those of the single burner.

In the burner system including the regenerative combustion burner 10, when the exhaust gas from the combustion chamber (of about 900° C.) passes through the heat storage member 30, the storage member 30 retrieves the heat of the exhaust gas and stores the heat so that the temperature of the heat storage member 30 is raised to about 900° C. and the temperature of the exhaust gas is decreased to about 200–250° C. When operation is switched between air supply and gas exhaust, the heat storage member 30 releases the storing heat to supply air (main air) to raise the temperature of the main air from the ambient temperature to about 900° C. In this way, the heat of the exhaust gas is retrieved and is utilized for preheating supply air. As a result, the thermal efficiency of the burner system is greatly improved to about 90%.

Fluid (for example, air) is caused to flow in the fluid passage 6 between the wall structure 5 of the combustion chamber 1 and the wall 5a of the casing 2 by the device 3 (for example, a fan or blower). The fluid is heated due to the heat transfer through the wall structure 5 and is supplied as a hot fluid to the equipment (not shown) needing the hot fluid.

Because the regenerative combustion burner 10 is used in the apparatus, burnt fuel gas recirculates in the combustion chamber and combustion is slacked due to the exhaust gas recirculation (EGR) effect. Due to the slack of combustion, the flame extends toward the end of the combustion chamber opposite to the burner, and the heat flux is uniform or flat along the flame. As a result, a hot spot is unlikely to be caused in the wall structure 5 of the combustion chamber 1.

Due to the uniform heat flux by using the regenerative combustion burner 10, the temperature of the combustion chamber can be raised without generating a hot spot and the flame is prolonged, so that a sufficient heat transfer is conducted at the radiation heat transfer portion only. Further, a convective heat transfer portion such as a fire tube portion of the conventional apparatus does not need to be provided. FIG. 1 shows such an apparatus which is not provided with a fire tube portion.

Due to removal of the convective heat transfer portion (the fire tube portion of the conventional furnace), the structure of the apparatus is simplified and down-sized.

Because of the prolonged flame by using the regenerative combustion burner 10, the portion 1a of the combustion chamber opposite to the burner (the portion where fire tubes are disposed in the conventional apparatus) can be utilized as a radiation heat transfer portion. FIG. 1 shows an apparatus utilizing that portion 1a as a radiation heat transfer portion.

Because the portion 1a does not occupy a large space unlike the fire tube portion, utilizing the portion 1a as a part of the heat transfer portion makes the apparatus compact and simple.

Though the apparatus according to the present invention does not need the convective heat transfer portion, the regenerative combustion burner may be mounted to such a furnace which has both a radiation heat transfer portion and a convective heat transfer portion (for example, the conventional furnace), which should be understood to be included in the present invention.

Structures and technical advantages of portions unique to each embodiment of the present invention will now be explained.

With a first embodiment of the present invention, as illustrated in FIGS. 1–3, the fluid passage 6 is formed over an entirety of a transverse configuration of the wall structure 5 of the combustion chamber 1 and is open toward the upstream side thereof. The device 3 for causing the fluid to flow in the fluid passage 6 includes a fan (which may be a blower) connected to the fluid passage 6 downstream thereof and suctions fluid through the fluid passage 6.

In the apparatus, fluid flows into the fluid passage 6 from the upstream side thereof, and the fluid flow is uniform. As a result, heat transfer from the wall structure 5 to the fluid is uniform over the entirety of the transverse configuration of the wall structure of the combustion chamber 1. Further, the efficiency of heat transfer is improved as compared with the case of non-uniform flow. In this instance, the efficiency of heat transfer as high as about 95% is obtained.

With a second embodiment of the present invention, as illustrated in FIG. 4, the fluid passage 6 is formed over an entirety of a transverse configuration of the wall structure 5 of the combustion chamber 1 and is closed at the upstream end thereof. The device 3 for causing the fluid to flow in the fluid passage 6 includes a fan (which may be a blower) connected to the fluid passage 6 at the upstream end thereof and supplies fluid into the fluid passage 6.

In the apparatus, since the temperature of the fluid passing through the device 3 is an ambient temperature, the device 3 does not need to be of a heat-proof type.

With a third embodiment of the present invention, as illustrated in FIGS. 5 and 6, the wall structure 5 includes a fin 7, 8 or a wavy portion 9 which protrudes into the fluid passage 6 to generate turbulence. The fin 7 is a spiral fin coupled to the outside surface of an axially extending portion of the wall structure, and the fin 8 is a radially extending curved fin coupled to the outside surface of a portion of the wall opposite to the burner.

Due to the fin or wavy structure, turbulence is generated in the fluid flowing in the fluid passage 6. As a result, the coefficient of convective heat transfer from the outside surface of the wall structure 5 to the fluid is increased so that: the heat transfer is improved. In the case of the fin 7, the fluid flows spirally in the fluid passage, which substantially makes the length of the fluid passage long and makes the flow more uniform in the transverse direction of the combustion chamber, whereby the heat transfer is improved.

With a fourth embodiment of the present invention, as illustrated in FIG. 7, the burner system includes an air supply passage 53 and an exhaust gas passage 59 which are connected to the at least one regenerative combustion burner 10. The burner system further includes an exhaust gas recirculation passage 61 for permitting a portion 60 of exhaust gas flowing in the exhaust gas passage 59 to recirculate to the air supply passage 53. The air supply passage 53 is provided with a blower 54 (which may be a fan) for supplying air for combustion to the regenerative combustion burner 10. The exhaust gas recirculation passage 61 connects the exhaust gas passage 59 and a portion of the air supply passage 53 upstream of the blower or fan 54. The exhaust gas recirculation passage 61 is provided with a damper 62. The damper 62 is driven by a damper drive device 63 so that the damper 62 controls the amount of exhaust gas recirculated from the exhaust gas passage 59 to the air supply passage 53.

Due to the above-described structure, exhaust gas recirculation (EGR) is conducted not only in the combustion chamber 1 where a portion of the burnt fuel gas is inevitably recirculated to the supply air but also outside the combustion chamber 1 where a portion of the exhaust gas is recirculated to the supply air through the exhaust gas recirculation passage 61. This exhaust gas recirculation conducted outside the combustion chamber 1 is controllable by the damper 62 in amount. Due to the exhaust gas recirculation, the combustion is slacked and generation of NOx is suppressed whereby the apparatus is a clean furnace capable of satisfying the environmental regulations. Further, in the case of the regenerative combustion, even if the combustion is slacked, all of the fuel is burned and the portion of the heat generated by the fuel which has not worked at the combustion chamber 1 is retrieved by the heat storage member 30 when the exhaust gas passes through the heat storage member 30 and is utilized for preheating supply air, so that a thermal efficiency higher than 90% is obtained.

Further, due to the exhaust gas recirculation, the sensitive heat of the recirculated exhaust gas is returned to the supply air, which improves the thermal efficiency. In this instance, since the supply air is preheated by the heat storage member 30, the combustion is stable. As a result, even if a relatively large amount of exhaust gas is recirculated, combustion is maintained stably.

The fifth embodiment of the present invention includes control for the exhaust gas recirculation. More particularly, in the fourth embodiment of the present invention, when the apparatus is started from a cold stage, the combustion may be unstable because the supply air has not yet been preheated sufficiently. To prevent this, the damper 62 should be closed during the start-up of the apparatus, and the damper 62 should be open after the apparatus has been in a normal operating state. The structure for this feature is provided in the fifth embodiment of the present invention.

In the fifth embodiment of the present invention, as illustrated in FIG. 8, an exhaust gas temperature sensor 66 for detecting a temperature of exhaust gas from the regenerative combustion burner 10 and an oxygen concentration detecting sensor 65 for detecting an oxygen concentration of exhaust gas from the regenerative combustion burner 10 are installed in the exhaust gas passage 59. The outputs of the sensors 65 and 66 are fed to a damper opening degree control device 64 for controlling the opening degree of the damper 62. The oxygen sensor 65 may be replaced by another combustion state detecting sensor such as a CO sensor and a flame brightness detecting sensor.

FIG. 9 illustrates the flow of a damper opening degree control routine. A temperature of the exhaust gas after the burner 62 is ignited is detected by the temperature sensor 66. The temperature may be replaced by a temperature of the fluid or a temperature of the wall of the combustion chamber. The detected temperature is compared with a predetermined temperature at step 101. When the detected temperature exceeds the predetermined temperature, it is determined that the apparatus has been warmed-up to a normal condition, and control of the damper 62 which has been closed is started at step 102. Then, an oxygen concentration detected by the oxygen sensor is compared with a predetermined oxygen concentration at step 103. If the detected oxygen concentration is higher than the predetermined oxygen concentration, it is judged that the amount of recirculated exhaust gas is permitted to be increased, and the opening degree of the damper 62 is increased at step 104. If the detected oxygen concentration is not higher than the predetermined oxygen concentration, the routine proceeds to step 105 where a decision is made as to whether or not the detected oxygen concentration is equal to the predetermined oxygen concentration. When the detected oxygen concentration is equal to the predetermined oxygen concentration, it is judged that the current oxygen concentration is appropriate, and the opening degree of the damper 62 is fixed at the current opening degree for a predetermined time period at step 106. When the detected oxygen concentration is less than the predetermined oxygen concentration, it is judged that the amount of recirculated exhaust gas is too large, and the opening degree of the damper 62 is decreased at step 107 to prevent combustion from being unstable. The above-described cycle is repeated so that an appropriate amount of exhaust gas is recirculated. In this way, both stability of combustion and suppression of generation of NOx are achieved at the same time.

The sixth embodiment of the present invention relates to a structure of the combustion chamber for promoting self-recirculation of exhaust gas in the combustion chamber. In the sixth embodiment of the present invention, as illustrated in FIG. 10, a portion 1b of the wall 5 of the combustion chamber 1 close to the burner 10 is formed to be a cone decreased in diameter toward the burner 10, and a portion 1a of the wall structure 5 of the combustion chamber 1 opposite to the burner 10 is formed to be a cone decreased in diameter in the direction away from the burner 10.

Due to the structure, recirculation of the gas in the combustion chamber 1 is smooth so that the heat flux in the combustion chamber is uniform. By keeping the level of the uniform heat flux high, the thermal efficiency of the apparatus is improved. Further, due to the smooth self-recirculation of the fuel burnt gas to the supply air, generation of NOx is suppressed.

Further, a portion 67 of the exhaust gas passage 59 is arranged in front of a suction port of the fan or blower 54 so that a part of the heat of the exhaust gas at 150–200° C. after passing through the heat storage member is retrieved to the air suctioned to the fan or blower through convective heat transfer. Due to the heat retrieve, the thermal efficiency of the apparatus is further increased to bout more than 97%. Further, since a temperature of the gas exhausted to the atmosphere is decreased, no environmental problem will be caused.

According to the present invention, the following technical advantages are obtained:

Since a regenerative combustion burner 10 is used, the heat flux is uniform in the combustion chamber 1 and a hot spot is unlikely to be caused in the wall structure 5 of the combustion chamber 1.

Since a convective heat transfer portion is removed from the apparatus, the structure of the apparatus is simple and compact.

Since a portion 1a of the wall structure 5 opposite to the burner 10 is utilized as a radiation heat transfer portion, the structure of the apparatus is simple and compact.

In the case where the device 3 for causing the fluid to flow in the fluid passage 6 suctions the fluid from the downstream side of the fluid passage 6, the flow of the fluid in the fluid passage 6 is uniform so that the efficiency heat transfer is improved.

In the case where the device 3 for causing the fluid to flow in the fluid passage 6 supplies the fluid from the upstream side of the fluid passage 6, the device 3 does not need to be of a heat-proof.

In the case where a fin 7, 8 protruding into the fluid passage 6 is provided, turbulence is generated in the fluid and the heat transfer is improved.

In the case where the wall structure 5 contacting the fluid passage 6 is made wavy, turbulence is generated in the fluid and the heat transfer is improved.

In the case where the air supply passage 53 and the exhaust gas passage 59 are connected by the exhaust gas recirculation passage 61 and a damper 62 is installed in the passage 61, a portion of the exhaust gas from the burner 10 is recirculated to the supply air and the amount of recirculated exhaust gas can be controlled. As a result, the combustion in the combustion chamber 1 is slacked and generation and exhaust of NOx is suppressed.

In the case where the damper is closed during start-up of the apparatus from a cold state, combustion during the start-up of the apparatus is stable.

In the case where the portion 1b of the combustion chamber 1 close to the burner 10 is formed in the form of a cone, self-recirculation of the fuel burnt gas to the supply air in the combustion chamber 1 is smooth. As a result, NOx generation is effectively suppressed.

Although the present invention has been described with reference to specific exemplary embodiments, it will be appreciated by those skilled in the art that various modifications and alterations can be made to the particular embodiments shown without materially departing from the novel teachings and advantages of the present invention. Accordingly, it is to be understood that all such modifications and alterations are included within the spirit and scope of the present invention as defined by the following claims.

What is claimed is:

1. A hot fluid generating apparatus comprising:
    a wall structure defining a combustion chamber, said combustion chamber including a flame radiation heat transfer portion;
    a burner system including at least one regenerative combustion burner each including a heat storage member, said burner system being constructed and arranged to conduct a regenerative combustion wherein combustion air supplied through said heat storage member into said combustion chamber forms a flame and exhaust gas within said combustion chamber and the exhaust gas in said combustion chamber is exhausted through said heat storage member whereby a portion of heat of the exhaust gas is stored in said heat storage member so that the heat stored in said storage member is then released to and preheats combustion air flowing through said heat storage member;
    a fluid passage formed along said wall structure of said combustion chamber; and
    a device for causing fluid to flow through said fluid passage;
    said wall structure of said combustion chamber having a portion adjacent to said at least one regenerative combustion burner, said portion of said wall structure having the shape of a cone gradually decreasing in diameter toward said at least one regenerative combustion burner.

2. An apparatus according to claim 1, wherein said burner system includes a single said burner and said burner is of the type capable of switching air supply and gas exhaust by itself, said burner comprising:
    a burner tile disposed on one axial side of said heat storage member;
    a switching mechanism for switching air supply and gas exhaust, disposed on another axial side of said heat storage member opposite said one side; and
    a fuel supply pipe extending through said heat storage member to said burner tile.

3. An apparatus according to claim 1, wherein said burner system comprises a pair of said burners, each of said burners comprising:
    a burner tile disposed on one axial side of said heat storage member; and
    a fuel supply pipe extending through said heat storage member to said burner tile, and wherein each of said burners is connected to piping for use in air supply to, and gas exhaust from, each of said burners, said piping being provided with a switching valve for switching air supply to, and gas exhaust from, each of said burners outside of said burners.

4. An apparatus according to claim 1, wherein said device for causing fluid to flow through said fluid passage includes any one of a fan, a blower and a pump.

5. An apparatus according to claim 1, wherein said combustion chamber includes a heat transfer portion including substantially only said flame radiation heat transfer portion.

6. An apparatus according to claim 1, wherein said wall structure defining said combustion chamber has a portion located opposite to said at least one regenerative combustion burner, said portion of said wall structure being utilized as a portion of said flame radiation heat transfer portion.

7. An apparatus according to claim 1, wherein said fluid passage is open toward an upstream end of said chamber and said device includes a suction fan connected to said fluid passage at a downstream end of said chamber.

8. An apparatus according to claim 1, wherein said device includes a blower connected to said fluid passage generally at an upstream end thereof.

9. An apparatus according to claim 1, wherein said wall structure of said combustion chamber has a fin protruding into said fluid passage.

10. An apparatus according to claim 1, wherein said wall structure includes a wavy portion having an outside surface exposed to said fluid passage.

11. An apparatus according to claim 1, wherein said burner system includes an air supply passage and an exhaust gas passage connected to said at least one regenerative combustion burner and an exhaust gas recirculation passage for permitting a portion of exhaust gas flowing in said exhaust gas passage to recirculate to said air supply passage, said exhaust gas recirculation passage being provided with a damper.

12. An apparatus according to claim 11, wherein said damper is controlled to close said exhaust gas recirculation passage during start-up of said apparatus from a cold state.

13. An apparatus according to claim 11, wherein said air supply passage is provided with a blower for supplying combustion air to said at least one regenerative combustion burner, said exhaust gas recirculation passage connecting said exhaust gas passage and a portion of said air supply passage upstream of said blower.

14. An apparatus according to claim 11, further including a damper opening control device for controlling an opening amount of said damper, and wherein said exhaust gas passage is provided with an oxygen concentration detecting sensor and an exhaust gas temperature detecting sensor electrically connected to said damper opening control device.

15. An apparatus according to claim 14, wherein said damper opening control device includes a controller adapted to control said opening amount of said damper so that when the oxygen concentration detected by said oxygen concentration detecting sensor is equal to or higher than a predetermined oxygen concentration, the opening amount of said damper is increased, and when the oxygen concentration detected by said oxygen concentration detecting sensor is lower than said predetermined oxygen concentration, the opening amount of said damper is decreased.

16. An apparatus according to claim 1 wherein the exhaust gas in said combustion chamber is exhausted such that all of the exhausted exhaust gas passes through said heat storage member through which said combustion air was supplied.

* * * * *